(12) United States Patent
Raaf

(10) Patent No.: US 6,469,990 B1
(45) Date of Patent: *Oct. 22, 2002

(54) METHOD AND APPARATUS FOR CONTROLLING THE RECEPTION OF DATA PACKETS IN A MOBILE STATION

(75) Inventor: Bernhard Raaf, München (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,767

(22) Filed: Jan. 31, 2000

Related U.S. Application Data

(63) Continuation of application No. PCT/DE98/02043, filed on Jul. 21, 1998.

(30) Foreign Application Priority Data

Jul. 31, 1997 (DE) .......................................... 197 33 118

(51) Int. Cl.$^7$ ............................................... H04L 12/43
(52) U.S. Cl. ......................... 370/311; 370/349; 370/410
(58) Field of Search ................................. 370/311, 336, 370/337, 345, 347, 349, 350, 410, 389, 503, 509, 514, 354

(56) References Cited

U.S. PATENT DOCUMENTS

| | | | |
|---|---|---|---|
| 5,199,031 A | | 3/1993 | Dahlin |
| 5,390,216 A | * | 2/1995 | Bilitza et al. ................ 375/354 |
| 5,654,960 A | * | 8/1997 | Kohlschmidt ................ 370/337 |
| 5,854,784 A | * | 12/1998 | Solve et al. ................. 370/311 |
| 5,886,992 A | * | 3/1999 | Raatikainen et al. ........ 370/410 |
| 5,987,023 A | * | 11/1999 | Albrow et al. .............. 370/350 |

FOREIGN PATENT DOCUMENTS

| | | |
|---|---|---|
| DE | 195 24 744 A1 | 1/1997 |
| EP | 0 540 808 A2 | 5/1993 |

OTHER PUBLICATIONS

Jacek Biala: "Mobilfunk und Intelligente Netze", Vieweg, 1994, pp. 74–82, mobile radios and intelligent nets.
"The GSM System", XP–002089392, pp. 214–215, 333–336.

* cited by examiner

*Primary Examiner*—Alpus H. Hsu
*Assistant Examiner*—Afsar M. Qureshi
(74) *Attorney, Agent, or Firm*—Laurence A. Greenberg; Werner H. Stemer; Gregory L. Mayback

(57) ABSTRACT

A method and a mobile station for controlling reception of data packets in a receiving unit of a mobile station in a mobile radio system. The receiving unit can in each case be switched during predetermined time frames to receive data packets to be detected from base stations, in which case a plurality of predetermined time frames are each assigned to receive data packets from a specific base station. The base station transmits characteristic data packets at a predetermined time interval before the data packets to be detected. The receiving unit is also switched to receive characteristic data packets from the respective base station during the predetermined time frames in which it is switched to receive data packets to be detected. If it does not receive either a data packet to be detected or a characteristic data packet from the respective base station in a predetermined time frame, the receiving unit is not switched to receive data packets from this base station during the next predetermined time frame which is assigned to this base station because no data packet to be detected from this base station can occur.

18 Claims, 2 Drawing Sheets

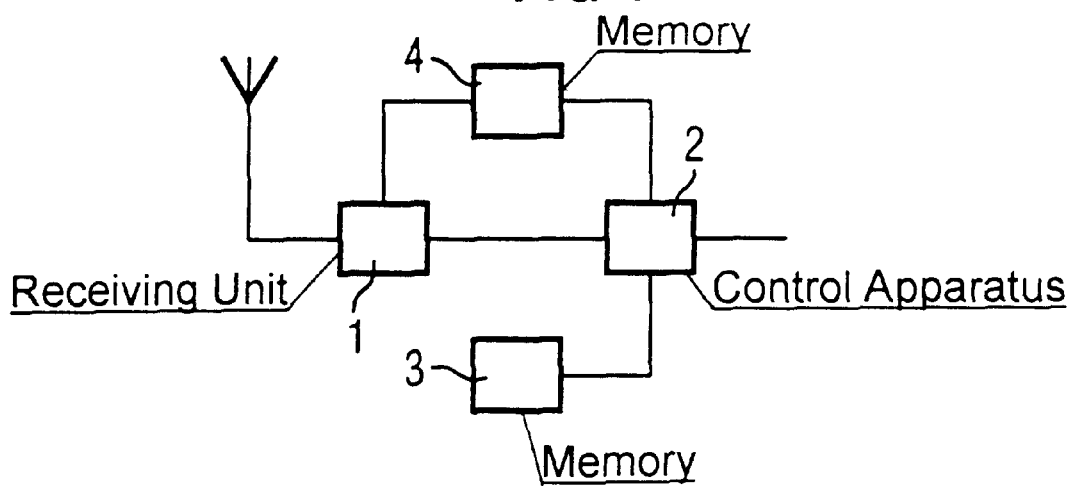
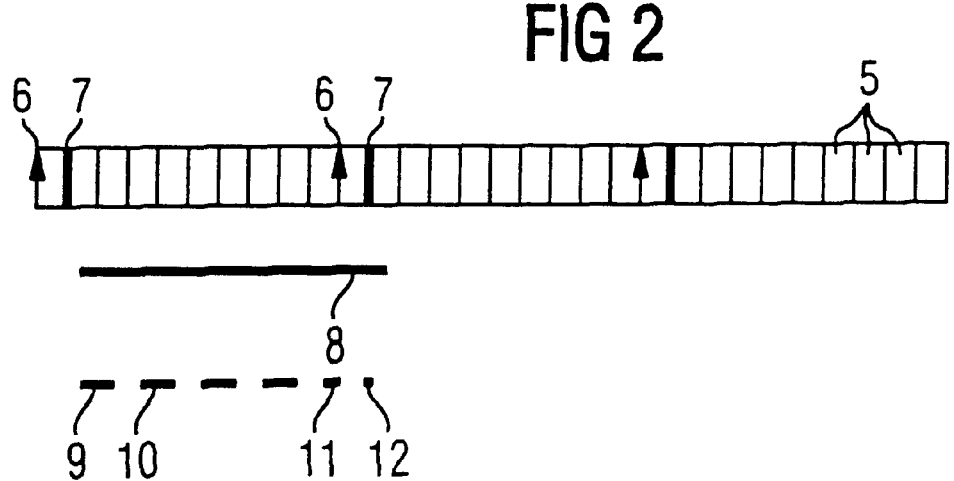

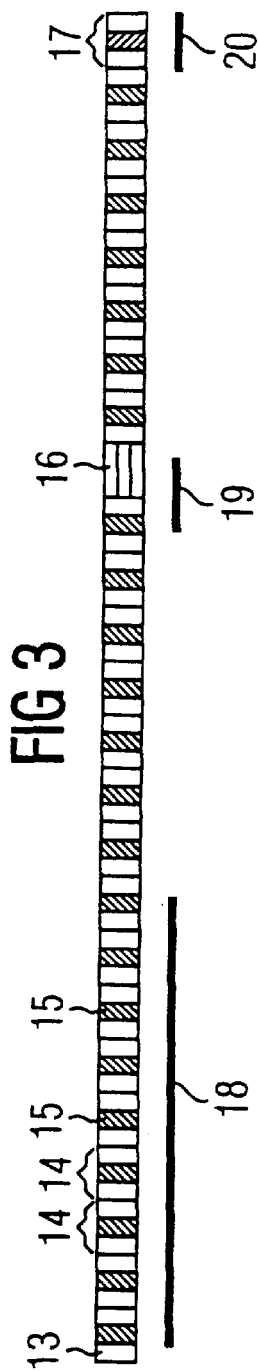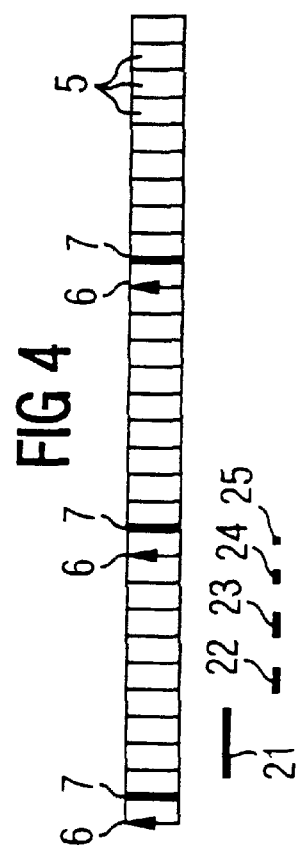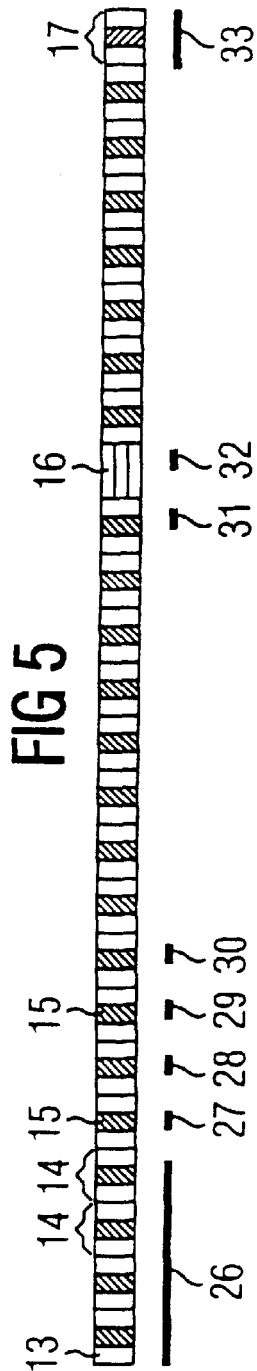

METHOD AND APPARATUS FOR CONTROLLING THE RECEPTION OF DATA PACKETS IN A MOBILE STATION

CROSS REFERENCE TO RELATED APPLICATION

This is a continuation of copending International Application PCT/DE98/02043, filed Jul. 21, 1998, which designated the U.S.

BACKGROUND OF THE INVENTION

Field of the Invention

The present invention relates, in general, to a method for controlling the reception of data packets in a receiving unit of a mobile station such that power consumption of the mobile station can be conserved, and to such a mobile station.

Such methods for controlling reception of data packets in a receiving unit of a mobile station in a mobile radio system, and such mobile stations having control apparatus for controlling reception of data packets in a receiving unit in the mobile station are known from the prior art. During a call, that is to say when connected to a present base station, and during readiness to receive, that is to say when in the idle state, a mobile station in a mobile radio system has to regularly search predetermined frequencies for data packets from adjacent base stations and has to recognize their identity while it is connected to the present base station. As a rule, the identity is recognized by decoding the so-called BSIC (Base Station Identity Code) in the synchronization data packet. To do this, each base station regularly transmits synchronization data packets. In the GSM Standard, the base stations transmit a synchronization data packet with a duration of one time slot every ten or eleven time frames, with eight time slots forming one time frame.

In the GSM Standard, during a call, a mobile station can monitor an adjacent channel every 26 frames, for a period of somewhat more than one time frame. This one time frame is the so-called idle frame, in which the mobile station does not interchange data with the present base station. The idle frame is used to monitor adjacent channels and, if necessary, to find and to decode synchronization data packets from adjacent base stations. In the GSM Standard, the base stations transmit five synchronization data packets, with a duration of one time slot, within each multiple frame, which comprises 51 time frames. These synchronization data packets are transmitted by the base stations four times every ten frames, and then once after eleven frames. Since the mobile stations have an idle frame for monitoring the adjacent channels once in each 26 time frames, a mobile station can receive a synchronization data packet from an adjacent base station at the latest after eleven idle frames, irrespective of the relative timing of the synchronization data packets. Rather than monitoring a specific adjacent channel in two successive idle frames, another known option is to switch the mobile station to receive data packets from the adjacent base station in every other idle frame. This method is somewhat more elegant, but doubles the mean time that passes before reception of a synchronization data packet from an adjacent base station.

If a mobile station is ready to receive, that is to say in the idle state, more time is available for monitoring adjacent channels, since there is no need to interchange data continuously with the present base station. The mobile station can then continuously be switched to receive data packets from in each case one adjacent base station, and thus recognizes a synchronization data packet from an adjacent base station at the latest after eleven time frames. If it is not possible to receive data packets from one adjacent base station since, for example, the distance between the mobile station and the base station is too great or there is excessive interference on the transmission path, then this is confirmed after eleven time frames when the mobile station is ready to receive and after 26×11 time frames during a call.

In the method known from the prior art and the apparatus for controlling reception of data packets in a mobile station, the receiving unit of the mobile station is switched to receive synchronization data packets. That is to say a search is carried out for synchronization data packets from the respective adjacent base stations. The mobile station uses the synchronization data packets to synchronize itself to the adjacent base stations, in order to allow a handover from a present base station to an adjacent base station. In the GSM Standard, the base stations always transmit a frequency correction data packet one time frame before the synchronization data packets. This frequency correction data packet is used to match the frequency of the crystal oscillator in the mobile station to the base station when a link is set up (or set up again) from a mobile station to an adjacent base station. Since the crystal oscillator in the mobile stations is not generally sufficiently frequency-stable, the mobile station uses the frequency correction data packet to determine the frequency of the base station relative to the frequency of the crystal oscillator when it synchronizes itself to a base station for the first time.

A disadvantage of the methods and apparatus known from the prior art for controlling reception of data packets in a receiving unit of a mobile station in a mobile radio system is that the receiving unit in the mobile station is switched on in each time frame associated with a specific adjacent base station (for example the idle frames during a call), in order to attempt to receive synchronization data packets from the respective base station. This means that the receiving unit is switched to receive synchronization data packets even if there is no chance whatsoever of being able to receive synchronization data packets from the respective base station. However, switching on the receiving unit in the mobile station costs energy and reduces the call time and the time during which the mobile station is ready to receive.

SUMMARY OF THE INVENTION

It is accordingly an object of the present invention to provide a method and an apparatus to ensure that power consumption in the mobile station is reduced.

With the foregoing and other objects in view there is provided, in accordance with the invention, a method for controlling reception of data packets in a receiving unit of a mobile station in a mobile radio system. The receiving unit can in each case be switched during predetermined time frames to receive data packets to be detected from base stations, in which case a plurality of predetermined time frames are each assigned to receive data packets from a specific base station. The base station transmits characteristic data packets at a predetermined time interval before the data packets to be detected. The receiving unit is also switched to receive characteristic data packets from the respective base station during the predetermined time frames in which it is switched to receive data packets to be detected. If it does not receive either a data packet to be detected or a characteristic data packet from the respective base station in a predetermined time frame, the receiving unit is not switched to receive data packets from this base station during the next predetermined time frame which is assigned to this base station because no data packet to be detected from this base station can occur.

In accordance with the invention, a mobile station in a mobile radio system is correspondingly provided with a control apparatus for controlling reception of data packets in a receiving unit in the mobile station. The control apparatus can in each case switch the receiving unit during predetermined time frames to receive data packets to be detected from base stations. A plurality of predetermined time frames are in each case assigned to receive data packets from a specific base station, and the base stations transmit characteristic data packets at a predetermined time interval before the data packets to be detected. The control apparatus also switches the receiving unit to receive characteristic data packets from the respective base station during the predetermined time frames in which it switches this receiving unit to receive data packets to be detected. If it does not receive either a data packet to be detected or a characteristic data packet from the respective base station in a predetermined time frame, the receiving unit does not switch to receive data packets from this base station during the next predetermined time frame that is assigned to this base station because no data packet to be detected from this base station can occur.

In this first embodiment of the present invention, the receiving unit is thus switched to receive both data packets to be detected and characteristic data packets for adjacent channel monitoring. In the process, similar algorithms can be used for the recognition and evaluation of the data packets to be detected and the characteristic data packets in the mobile station, since both types of data packets are distinguished by a long, known bit sequence. The first embodiment of the present invention is based, in particular, on the fact that, if neither a characteristic data packet nor a data packet to be detected is received in a time frame, there cannot be a data packet to be detected in the next time frame, but at most one characteristic data packet. The reason for this is that the base stations always transmit a characteristic data packet one time frame before each data packet to be detected. If no characteristic data packet has been received by the receiving unit in the mobile station, it is thus not possible for a data packet to be detected to occur in the next time frame. There is thus no need to monitor this adjacent base station during this time frame.

In the ready-to-receive state and when the mobile station is switched on, this thus relates to the immediately following time frames since, in the ready-to-receive state, the mobile station uses a plurality of directly successive time frames for monitoring a specific base station. If the receiving unit does not receive either a data packet to be detected or a characteristic data packet in a predetermined time frame, then it can be certain that no data packet to be detected from this base station can occur in the immediately following time frame. Thus, the receiving unit can remain switched off during this immediately following time frame, thus saving a considerable amount of power in the mobile station.

During a call in the GSM System, the monitoring of a specific adjacent base station is generally carried out every 26 time frames, during the idle frame. Since the fundamental repetition rate of the sequence of a (characteristic) frequency correction data packet and of a synchronization data packet (to be detected) from the base stations is 51 time frames, the receiving unit in the mobile station can thus remain switched off in the next-but-one (one after the next) predetermined time frame if it does not receive either a synchronization data packet or a frequency data packet from the respective adjacent base station in a predetermined time frame. In the GSM System, this next-but-one time frame is the next-but-one idle time frame, which occurs again after (2×26=) 52 time frames. Since the repetition rate of the frequency correction data packets and data packets to be detected from the base station is 51 time frames, it is thus possible to predict confidently that, if neither a synchronization data packet nor a frequency correction data packet occurs in a specific time frame, no synchronization data packet from the same base station can occur after (51+1=) 52 time frames. The receiving unit in the mobile station can thus remain switched off during the next-but-one time frame once again this results in a considerable power savings.

When the mobile station is in the ready-to-receive state, the first embodiment of the present invention reduces, by virtually 50% (to be more precise: $7/16=44\%$), the time during which the receiving unit must be switched on to search for adjacent channels. This results in a considerable power saving and thus in the time during which the mobile station is ready to receive being considerably extended.

In accordance with another feature of the invention, there is provided a second embodiment of the method for controlling reception of data packets in a receiving unit of a mobile station in a mobile radio system, in which the receiving unit can in each case be switched for predetermined time frames to receive data packets which are to be detected from base stations. A plurality of predetermined time frames are each assigned to receive data packets from a specific base station, and the base stations transmit characteristic data packets at a predetermined time interval before the data packets to be detected. The receiving unit is also switched to receive characteristic data packets and normal data packets from the respective base station during the predetermined time frames in which it is switched to receive data packets to be detected. The normal data packets each have a training sequence. The receiving unit in each case receives at least one normal data packet from the respective base station at the start of a time frame which is assigned to a specific base station. In order to determine the position of the training sequence in the normal data packets from the respective base station, the receiving unit is switched to receive data packets from the respective base station only during those times which correspond to the training sequences of the normal data packets in the time frames which are assigned to the respective base station.

In accordance with the second embodiment of the invention, there is provided a mobile station in a mobile radio system, having a control apparatus for controlling reception of data packets in a receiving unit in the mobile station. The control apparatus can in each case switch the receiving unit during predetermined time frames to receive data packets to be detected from base stations. A plurality of predetermined time frames are in each case assigned to receive data packets from a specific base station, and the base stations transmit characteristic data packets at a predetermined time interval before the data packets to be detected. The control apparatus also switches the receiving unit to receive characteristic data packets and normal data packets from the respective mobile station during the predetermined time frames in which it switches this receiving unit to receive data packets to be detected. The normal data packets each have a training sequence, and the receiving unit in each case receives at least one normal data packet from the respective base station at the start of a time frame which is assigned to a specific base station. Using the normal data packet, an evaluation unit determines the position of the training sequence in the normal data from the respective base station, whereupon the control apparatus, in the time frames which are assigned to the respective base station, switches the receiving unit to receive data packets from the respective base station only during the times which correspond to the training sequences of the normal data packets.

This second embodiment of the present invention is thus based on the fact that the receiving unit in the mobile station can receive characteristic data packets, data packets to be detected, and normal data packets. From receiving at least one normal data packet, the mobile station can determine the position of the training sequences in the normal data packets, at which point the receiving unit is switched to receive data packets from the adjacent base station only during the times which correspond to the position of the training sequences in the normal data packets. This prevents the receiving unit from being switched to receive data packets from the respective base station during those times in which the reception and the detection of characteristic data packets or data packets to be detected is impossible, or scarcely possible. This also results in considerable power savings in the mobile station.

The method and the mobile stations of the first and second embodiments of the present invention can advantageously be combined, by which means it is possible to achieve an even greater power saving in a mobile station.

Advantageously, with regard to the second embodiment of the present invention and with regard to the combination of the first and second embodiments of the present invention, the receiving unit is switched by the control apparatus to receive data packets from the respective base station in the time frames which are assigned to the respective base station only in a portion of the time periods which correspond to the training sequences in the normal data packets. The portion of the time periods is defined in such a manner that the data contained in this portion is sufficient to distinguish various types of data packets. Since the training sequences in the normal data packets and the bit sequences (which are located at an appropriate point) in the data packets to be detected and characteristic data packets are defined from the start and are different, two bits are sufficient in the worst case to recognize and distinguish the various types of data packets. In the worst case, it is thus sufficient to switch the receiving unit to receive data packets from the base station only during two bits. This allows a further major reduction in the power consumed in the mobile station.

With regard to the second embodiment of the present invention and the combination of the first and second embodiments of the present invention, the control apparatus advantageously determines the exact position of the training sequence in the normal data packets by comparing the training sequence in the at least one received normal data packet with possible training sequences that are stored in a memory in the mobile station. In the GSM Standard, for example, the normal data packets may have up to nine different bit sequences in the training frequencies. Recognition of a training sequence in a normal data packet is thus relatively complex. It is thus advantageous for the received bit sequences to be compared with possible training sequences in order to confirm whether a training sequence is actually present in a normal data packet, and where its exact position is. In this case, the accuracy is increased if the receiving unit can receive a plurality of normal data packets at the start of a specific time frame, since only the correct training sequences are, strictly, repeated in the time frame pattern of the normal data packets.

In both embodiments of the present invention, it is advantageous if the receiving unit receives a characteristic data packet from the respective base station in a predetermined time frame, and the receiving unit is not switched back to receive data packets from this base station until time between the data packets to be detected and the characteristic data packets. Since, in the GSM Standard, a (characteristic) frequency correction data packet is always transmitted by the base stations one time frame before a synchronization data packet (to be detected), it is thus possible, when a frequency correction data packet is received, for the receiving unit to remain switched off for one time frame, since the position of the synchronization data packet is in this case exactly known.

Furthermore, in both embodiments of the present invention, if it is not switched to receive data packets to be detected and characteristic data packets from the respective base station during one of the next predetermined time frames, the receiving unit is advantageously switched to receive data packets from another base station by the control apparatus. This is advantageous particularly when the mobile station is in the called state, since base stations can be found more quickly. Once again, this has the advantage of reducing the power consumption since, during a handover, it is possible to switch more quickly to a base station which may be transmitting more strongly. Furthermore, in fully extended mobile radio networks, this allows the cell size to be correspondingly reduced and, in consequence, the call capacity to be increased. Furthermore, mobile stations which are moving through small cell networks relatively quickly (cars in a town) lose a call if they cannot find new adjacent base stations sufficiently quickly. This problem is also solved by this refinement of the present invention.

Furthermore, in both embodiments of the present invention, it may be advantageous if the data packets received by the receiving unit in a predetermined time period from a respective base station are stored in a memory and are evaluated after the predetermined time period by the control apparatus. This is advantageous particularly if the signal processing in the mobile station is slow, in which case the received data packets cannot be identified in real time. In the GSM System, the data packets to be detected are synchronization data packets, and the characteristic data packets are frequency correction data packets.

Other features which are considered as characteristic for the invention are set forth in the appended claims.

Although the invention is illustrated and described herein as embodied in a method and apparatus for controlling the reception of data packets in a mobile station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a schematic view of a portion of a mobile station;

FIG. 2 shows a schematic view of a time frame pattern in order to illustrate a first embodiment of the present invention;

FIG. 3 shows a schematic view of a time frame pattern in order to explain in more detail the time frame pattern shown in FIG. 2;

FIG. 4 shows a schematic view of a time frame pattern in order to explain the second embodiment of the present invention; and FIG. 5 shows a schematic view of a time frame pattern in order to explain FIG. 4 in more detail.

DESCRIPTION OF THE PREFERRED EMBODIMENTS

FIG. 1 shows a schematic view of a part of a mobile station according to the invention for a mobile radio system having a receiving unit 1, which can be switched by a control apparatus 2 to receive data packets. The data packets coming from a present base station or from adjacent base stations are passed via an antenna to the receiving unit 1.

The control apparatus 2 can switch the receiving unit 1 to receive data packets from adjacent base stations, for example while the base station is engaged in a call with a present base station, during the idle time frames which occur every 26 time frames. In the ready-to-receive state, the control apparatus 2 can switch the receiving unit 1 to receive data packets from adjacent base stations during a plurality of successive time frames. Thus, when the mobile station is in the ready-to-receive state, a plurality of successive time frames are assigned to receive data packets from a specific adjacent base station while, when the mobile station is engaged in a call, a plurality of successive idle time frames are in each case assigned to receive data packets from a specific adjacent base station.

In a first embodiment of the present invention, the receiving unit 1 can receive synchronization data packets and frequency correction data packets from adjacent base stations while, in a second embodiment of the present invention, the receiving unit 1 can receive synchronization data packets, frequency correction data packets and, furthermore, normal data packets from the adjacent base stations. The control apparatus 2 can switch the receiving unit 1 to receive during the time frames which are assigned to receive the corresponding data packets. Since, for example in the GSM System, the frequency correction data packets are transmitted by the base stations one time frame before the synchronization data packets, the control apparatus 2 does not need to switch the receiving unit 1 to receive at times at which no synchronization data packets can possibly be received. If the receiving unit 1 does not receive either frequency correction data packets or synchronization data packets during an assigned time frame, then, when the mobile station is in the ready-to-receive state, the receiving unit 1 does not need to be switched on, or to remain switched on, in the time frame immediately following this, since no synchronization data packet can be expected in this next time frame. When the mobile station is engaged in a call, this relates to the next-but-one (the one after the next) assigned time frame. When the mobile station is engaged in a call, the receiving unit 1 is switched to receive data packets from the adjacent base station every 26 time frames, in the idle time frame. Since the repetition period of the synchronization data packets from the base stations is 51 time frames, no synchronization data packet can thus be expected from the same base station (51+1=) 52 time frames later if the receiving unit does not receive a frequency correction data packet in a time frame. The control apparatus 2 thus does not need to switch the receiving unit 1 to receive synchronization data packets and frequency correction data packets from the same base station in the next-but-one assigned time frame (the next-but-one idle time frame).

The first embodiment of the present invention is explained in more detail in FIGS. 2 and 3. In the second embodiment of the present invention, the control unit 2 controls the receiving unit 1 in such a way that the receiving unit 1 is synchronized to the time slot pattern of the respective adjacent base station, and is switched to receive data packets from this adjacent base station only during specific time intervals. The specific time intervals correspond to the position of the training sequences in the normal data packets from the base station, since the data packets from the base station can easily be distinguished on the basis of the training sequences and the corresponding bit sequences which are located at the position of the training sequences in the normal data packets.

A frequency correction data packet comprises a sequence of exclusively "1" and a synchronization data packet has a training sequence which is somewhat longer than and different than the normal data packets. It is thus sufficient to switch on the receiving unit 1 only during the time intervals which correspond to the training sequences in the normal data packets, in order to be able to receive, and to distinguish from one another in a sufficiently accurate manner, normal data packets, frequency correction data packets and synchronization data packets. In this case, ideally, two bits of the training sequence in the normal data packets may be sufficient to distinguish between the frequency correction data packets and the synchronization data packets. If more than two bits are compared, then the method works even if the signals contain errors (are noisy). The control apparatus 2 must in this case evaluate at least one normal data packet, which has been received by the receiving unit 1, at the start of an assigned time frame in order to determine the position of the training sequence. Since the training sequences can occur in up to nine different variations in the normal data packets from the base stations, it is advantageous to provide a memory 3 in the mobile station according to the invention, in which memory 3 all the possible training sequences which can be expected are stored. During evaluation of the training sequence in a normal data packet received by the receiving unit 1, the control device 2 can then compare the possible training sequences with the received training sequence and determine whether a training sequence is present in a normal data packet, and what its exact position is. The accuracy is in this case increased if the receiving unit 1 receives a plurality of normal data packets and, in consequence, the control apparatus 2 can evaluate a plurality of normal data packets and their training sequences. This is particularly advantageous since the normal data packets contain only a comparatively short training sequence in comparison to the frequency correction data packets and synchronization data packets, which training sequence can thus, erroneously, also be detected in the data bits transmitted together with the training sequence. Comparison of the received training sequence with the expected training sequences thus avoids a received bit sequence being incorrectly recognized as a training sequence and the receiving unit 1 correspondingly being incorrectly synchronized by the control apparatus 2. Since the receiving unit 1 is switched to receive only during specific time intervals, this on the one hand saves computation complexity in searching for and evaluating frequency correction data packets and synchronization data packets, while on the other hand a considerable amount of power is saved by switching the receiving unit 1 off, or not switching it on, between the training sequences. This second embodiment of the present invention is explained in more detail in FIGS. 4 and 5. In this case, FIGS. 4 and 5 also explain the combination of the two embodiments according to the invention.

For example, if the signal processing in the control apparatus 2 is relatively slow, and evaluation and thus control of the receiving unit 1 for receiving the data packets from the respective adjacent base station is not possible in real time, the data packets received by the receiving unit 1 from the respective base station are advantageously stored in a memory 4. The control apparatus 2 can then evaluate the received data packets after the assigned time frames. If, in this case, the evaluation lasts longer than the time in which the adjacent channel search is interrupted, the search is continued, for example, 51 time frames later when the mobile station is engaged in a call. In consequence, the control apparatus 2 has sufficient time to evaluate the data packets stored in the memory 4. The memory 4 must be able to record approximately nine time slots. Since the so-called deinterleaving memory is not used, for example, when the mobile station is in the ready-to-receive state, this memory could be used for buffer-storage of the data packets in a GSM mobile station.

The first and second embodiments of the present invention are explained in more detail in FIGS. 2 to 5. In this case, the FIGS. refer exclusively to the mobile station in the ready-to-receive state, in which mobile station a plurality of immediately successive time frames are in each case assigned to the search for data packets from an adjacent base station. FIGS. 3 to 5 apply as appropriate to a mobile station which is engaged in a call. When the mobile station is engaged in a call, although no immediately successive time frames are assigned for receiving data packets from respectively adjacent base stations, but respective time frames between each of which there is a fixed period (for example there is an idle time frame after every 26 times in the GSM Standard), the situation is the same as that when the mobile station is in the ready-to-receive state, owing to the repetition period of the synchronization data packets and frequency correction data packets from 51 time frames (four data packet pairs each having a period of 10 time frames and one data packet pair having a period of 11 time frames). This is due to the fact that the period of 26 time frames (idle time frame) and the period of 51 time frames have no common denominator, and the two time frame periods are thus shifted cyclically, so that the sought data packets are received from the respective base station after 11×26 time frames, provided the mobile station is not too far away from the respective adjacent base station or excessively severe interference occurs during the transmission.

FIG. 2 shows a time frame pattern for data packets transmitted by the base station. In the GSM Standard, each time frame 5 contains eight time slots. The data packets transmitted by the base stations, such as synchronization data packets, frequency correction data packets and normal data packets, all use the same time pattern. As has been explained above, a frequency correction data packet 6 and, in each case one time frame later, a synchronization data packet 7, are transmitted by the base stations 4 times every 10 time frames and then after 11 time frames (a total of 51 time frames).

In the case of methods and apparatuses known from the prior art, as is indicated by the plurality of time frames 8 under the time frame pattern, the receiving unit is switched on continuously (the mobile station is in the ready-to-receive mode), in order to receive and evaluate the synchronization data packet.

In the first embodiment of the present invention, the receiving unit in the mobile station is switched off if it receives neither a frequency correction data packet nor a synchronization data packet in a time frame. This is indicated by the time frames 9, 10 . . . 11, 12. The receiving unit is switched to receive the data packets in a first time frame 9, which is assigned to an adjacent base station. Since it receives neither a frequency correction data packet nor a synchronization data packet, the receiving unit is switched off in the time frame after this. In the next-but-one time frame 10, the receiving unit is switched to receive once again. This is repeated until the receiving unit receives a frequency correction data packet, in a time frame 11. The control unit then knows that a synchronization data packet must follow one time frame later. The receiving unit is then not switched to receive for the time frame in between, and is switched to receive again when the synchronization data packet occurs.

FIG. 3 shows a more detailed time slot pattern 13 with a large number of successive time slots, for example to the GSM Standard. The time slots 14 are normal data packets, and each have a training sequence 15 in the middle of the time slot. The time slot 16 is a frequency correction data packet, and the time slot 17 is a synchronization data packet. The frequency correction data packet comprises a series of identical data bits, and the synchronization data packet 17 has a training sequence in the middle, in a similar way to the normal data packets, but which differs from the training sequences in the normal data packets.

If the receiving unit in the mobile station does not receive either a frequency correction data packet or a synchronization data packet during a time frame 18, then the receiving unit is not switched to receive data packets from the respective adjacent base station during a time period of eight time slots or one time frame. It is switched on again after one time frame and continues the search, as is indicated by the time slots 19. When the receiving unit receives a frequency correction data packet 16, it is then switched off and is not switched to receive again during the next time frame, since the synchronization data packet 17 which follows the frequency correction data packet 16 always follows one time frame length later. The receiving unit is thus switched to receive again one time frame later, as is indicated by the time slot 20, and receives the synchronization data packet. If a synchronization data packet is received during the time slot 19, then the required information is immediately available.

FIG. 4 shows a time frame pattern having a large number of time frames 5, in order to illustrate the second embodiment of the invention. A frequency correction data packet 6 is followed one time frame later by a synchronization data packet 7, with each pair of data packets being ten time frames apart from one another. After four pairs of data packets, which are each ten time frames apart from one another, the next pair of data packets is 11 time frames away (a total of 51 time frames, GSM Standard). According to the second embodiment of the present invention, the receiving unit is switched to receive frequency correction data packets, synchronization data packets and normal data packets during a plurality of time slots 31. The normal data packets and their training sequences are used to synchronize the receiving unit to the time slot pattern and, after this, the receiving unit is in each case switched to receive only during those time slots which correspond to the position of the training sequences in the normal data packets. The time frames 22 and 23 in FIG. 4 are too coarse to illustrate this search, which in each case is carried out only in the middle of the time slots. The bars 22 and 23 in FIG. 4 correspond to the time frames 9 and 10 in FIG. 2, in which the receiving unit is in each case switched to receive for one time frame and, if it receives neither a frequency correction data packet nor a synchronization data packet, is not switched to receive during the next time frame. Within the time frames 22 and 23, the receiving unit is in each case switched on only in the middle of the time slots, as is explained in detail in FIG. 5. FIG. 5 shows a time slot pattern 13 having a plurality of successive normal data packets 14, which each have a training sequence 15 in the middle of the data packet. The time slot 16 is a frequency correction data packet, and the time slot 17 is a synchronization data packet. The synchronization data packet 17 likewise has a training sequence in the middle, but this is different than the training sequences in the normal data packets.

The receiving unit is continuously switched to receive the data packets from the respective adjacent base station during a plurality of time slots, as is indicated by the time slots 26. During this time, the receiving unit is synchronized by the control unit to the time slot pattern of the respective adjacent base station and, once this has been done, it is then switched on only in time periods which correspond to the position of the training sequences in the normal data packets, as is indicated by the time slot parts 27, 28, 29 and 30. In the illustrated example, the receiving unit is synchronized during four time slots to the time slot pattern of the respective adjacent base station, at which point the receiving unit is switched to receive only during the training sequence in each of the following four time slots. If the receiving unit has not received any frequency correction data packets or synchronization data packets during one time frame, then it is switched off in the next time frame, since no synchronization data packet can be expected. This procedure corresponds to the first embodiment of the present invention, which is illustrated in FIGS. 2 and 3. FIGS. 4 and 5 thus show a combination of the first and second embodiments of the present invention.

After the time slot part 30 in which it has not received either a frequency correction data packet or a synchronization data packet, the receiving unit is not switched to receive data packets from the corresponding base station for one time frame, that is to say eight time slots. During the time slot part 31, the receiving unit is switched to receive once again, in which case it is in turn switched to receive the data packets only during a short time period. In the next time slot part, the receiving unit receives a frequency correction data packet and thus knows that a synchronization data packet 17 will subsequently follow one time frame later. The receiving unit thus remains switched off in the time frame after the frequency correction data packet 16 and is not switched on again until the synchronization data packet 17, being switched on not only during the time period corresponding to the training sequence, but throughout the entire time slot 33 of the synchronization data packet. In a further refinement of the second embodiment of the present invention, which is not illustrated in the figures, the receiving unit can be switched only during a portion of the time period which corresponds to a training sequence in the normal data packets, as long as this portion or the bit sequences detected in it is or are sufficient to distinguish the synchronization data packets, frequency correction data packets and normal data packets. In the worst case, two bits are sufficient for this purpose, as long as the various data packets can still be distinguished. However, if the time at which a synchronization data packet arrives is fixed, then, as in the case of the second embodiment as well, reception takes place over the entire length of the time slot during the time slot in which the synchronization data packet is received, in order to be able to evaluate all the data in the synchronization data packet.

I claim:

1. A method for controlling the reception of data packets in a receiving unit of a mobile station in a mobile radio system, which comprises:

providing a mobile station with a receiving unit and a base station;

defining data packets including characteristic data packets and data packets to be detected;

using the base station to transmit the data packets by transmitting the characteristic data packets at a predetermined time interval before transmitting the data packets to be detected;

switching the receiving unit to receive the characteristic data packets during predetermined time frames in which the receiving unit is also switched to receive the data packets to be detected;

if the receiving unit has not received one of the characteristic data packets or one of the data packets to be detected during one of the predetermined time frames, switching the receiving unit such that it cannot receive any of the data packets from the base station during one of the remaining predetermined time frames that are assigned to the base station; and defining the remaining predetermined time frames to be time frames during which data packets to be detected cannot occur.

2. The method according to claim 1, which comprises:

providing each of a plurality of normal data packets with a training sequence;

transmitting the normal data packets from the base station;

switching the receiving unit to receive the normal data packets during the predetermined time frames and receiving at least one of the normal data packets at the beginning of one of the predetermined time frames to determine the position of the training sequences in the normal data packets; and subsequently switching the receiving unit to receive the plurality of normal data packets only during the time periods that correspond to the training sequences.

3. The method according to claim 2, which comprises:

switching the receiving unit to receive data packets from the base station only during a portion of the time periods that correspond to the training sequences of the normal data packets; and defining the portion of the time periods such that the data contained in the portion is sufficient to distinguish between various types of data packets.

4. The method according to claim 2, which comprises:

storing possible training sequences in a memory in the mobile station; and determining the exact position of the training sequences in the normal data packets by comparing the training sequence in the received at least one of the normal data packets with the stored possible training sequences.

5. The method according to claim 1, which comprises if the receiving unit receives a characteristic data packet from the base station during one of the predetermined time frames, switching the receiving unit back to receive data packets only after the predetermined time interval between the characteristic data packets and the data to be detected.

6. The method according to claim 1, which comprises if the receiving unit has not received one of the characteristic data packets or one of the data packets to be detected during one of the predetermined time frames, switching the receiving unit to receive data packets from another base station.

7. The method according to claim 1, which comprises:

storing, the data packets received by the receiving unit in one of the predetermined time frames, in a memory; and evaluating the data packets after the one of the predetermined time frames.

8. The method according to claim 1, which comprises:
providing the mobile station and the base station as part of a GSM system;
providing the data packets to be detected as synchronization data packets; and
providing the characteristic data packets as frequency correction data packets.

9. A method for controlling the reception of data packets in a receiving unit of a mobile station in a mobile radio system, which comprises:
providing a mobile station with a receiving unit and a base station;
defining data packets including characteristic data packets, data packets to be detected, and normal data packets;
providing each of the normal data packets with a training sequence;
using the base station to transmit the data packets by transmitting the characteristic data packets at a predetermined time interval before transmitting the data packets to be detected;
switching the receiving unit to receive the characteristic data packets and the normal data packets during predetermined time frames in which the receiving unit is also switched to receive the data packets to be detected;
switching the receiving unit to receive the normal data packets during the predetermined time frames and receiving at least one of the normal data packets at the beginning of one of the predetermined time frames to determine the position of the training sequences in the normal data packets; and
after determining the position of the training sequences in the normal data packets, switching the receiving unit to receive the plurality of normal data packets only during the time periods that correspond to the training sequences.

10. A mobile station in a mobile radio system, comprising:
a receiving unit for receiving data packets including characteristic data packets and data to be detected where the characteristic data has been transmitted from a base station at a predetermined time interval before the data to be detected has been transmitted from the base station; and
a control unit for controlling reception of data packets in the receiving unit, said control unit switching said receiving unit to receive the characteristic data packets during predetermined time frames in which said receiving unit is also switched to receive the data packets to be detected;
said control unit is configured to switch said receiving unit such that it cannot receive any of the data packets from the base station during one of the remaining predetermined time frames that are assigned to the base station, if said
receiving unit has not received one of the characteristic data packets or one of the data packets to be detected during one of the predetermined time frames;
wherein, the one of the remaining predetermined time frames is a time frame during which data packets to be detected cannot occur.

11. The mobile station according to claim 10, wherein:
said control unit is configured to switch the receiving unit to receive normal data packets from the base station during the predetermined time frames, each of the normal packets having a training sequence;
said receiving unit is configured to receive at least one of the normal data packets at the beginning of one of the predetermined time frames;
said control unit is configured to obtain the at least one of normal data packets to determine the position of the training sequences in the normal data packets; and
said control unit is configured to switch said receiving unit to receive the plurality of normal data packets only during the time periods that correspond to the training sequences.

12. The mobile station according to claim 11, wherein:
said control unit is configured to switch the receiving unit to receive data packets from the base station only during a portion of the time periods that correspond to the training sequences of the normal data packets; and
the portion of the time periods being such that the data contained in the portion is sufficient to distinguish between various types of data packets.

13. The mobile station according to claim 11, including:
a memory for storing possible training sequences;
said control unit being configured to determine the exact position of the training sequences in the normal data packets by comparing the training sequence in the received at least one of the normal data packets with the stored possible training sequences.

14. The mobile station according to claim 10, wherein:
said receiving unit is configured to receive a characteristic data packet from the base station during one of the predetermined time frames; and
said control unit is configured such that while said receiving unit is receiving the characteristic data packet, said control unit switches the receiving unit back to receive data packets only after the predetermined time interval between the characteristic data packets and the data to be detected.

15. The mobile station according to claim 10, wherein said control unit is configured to switch the receiving unit to receive data packets from another base station, if said receiving unit has not received one of the characteristic data packets or one of the data packets to be detected during one of the predetermined time frames.

16. The mobile station according to claim 10, including:
a memory for storing the data packets received by said receiving unit in one of the predetermined time frames;
said control unit being configured for evaluating the data packets after the one of the predetermined time frames.

17. The mobile station according to claim 10, wherein the mobile radio system is a GSM system, the data packets to be detected are synchronization data packets, and the characteristic data packets are frequency correction data packets.

18. A mobile station in a mobile radio system, comprising:
a receiving unit for receiving data packets including normal data packets which each have a training sequence, characteristic data packets, and data to be detected, where the characteristic data has been transmitted from a base station at a predetermined time interval before the data to be detected has been transmitted from the base station, said receiving unit configured to receive at least one of the normal data packets from the base station at the beginning of a time frame that is assigned to the base station; and
a control unit for controlling reception of the data packets in the receiving unit, said control unit switching said receiving unit to receive the characteristic data packets and the normal data packets during predetermined time frames in which said receiving unit is also switched to receive the data packets to be detected;

said control unit configured to determine the position of the training sequences in the normal data packets and switching the receiving unit to receive the data packets from the base station only during the time periods that correspond to the training sequences of the normal data packets.

* * * * *